United States Patent
Lee et al.

(10) Patent No.: US 12,397,593 B2
(45) Date of Patent: Aug. 26, 2025

(54) SOUND-ABSORBING DEVICE FOR A VEHICLE WHEEL

(71) Applicant: Toyota Motor Engineering & Manufacturing North America, Inc., Plano, TX (US)

(72) Inventors: Taehwa Lee, Ann Arbor, MI (US); Masaki Nakaoka, Ann Arbor, MI (US); Danil V. Prokhorov, Canton, MI (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 280 days.

(21) Appl. No.: 18/112,754

(22) Filed: Feb. 22, 2023

(65) Prior Publication Data
US 2024/0286440 A1    Aug. 29, 2024

(51) Int. Cl.
*B60C 19/00* (2006.01)
*B60B 21/02* (2006.01)

(52) U.S. Cl.
CPC .......... *B60C 19/002* (2013.01); *B60B 21/026* (2013.01); *B60B 2900/133* (2013.01)

(58) Field of Classification Search
CPC ............ B60B 2900/133; B60B 21/026; B60C 19/002
See application file for complete search history.

(56) References Cited

U.S. PATENT DOCUMENTS

| | | | |
|---|---|---|---|
| 6,516,849 B2 | 2/2003 | Flament et al. | |
| 8,418,735 B2 | 4/2013 | Kamiyama et al. | |
| 9,604,583 B2* | 3/2017 | Seo .................... | B60R 13/0884 |
| 10,850,558 B2 | 12/2020 | Shin | |
| 11,130,366 B2 | 9/2021 | Seung et al. | |
| 2002/0104600 A1* | 8/2002 | Flament ................. | B60C 17/04 |
| | | | 152/381.4 |
| 2011/0057505 A1* | 3/2011 | Nagata ...................... | B60B 1/06 |
| | | | 301/95.102 |
| 2011/0278091 A1* | 11/2011 | Honji ................... | G10K 11/172 |
| | | | 181/290 |
| 2015/0048669 A1* | 2/2015 | Zhu ........................ | B60B 19/00 |
| | | | 181/207 |
| 2018/0029425 A1* | 2/2018 | Nourzad ............... | B60C 19/002 |

(Continued)

FOREIGN PATENT DOCUMENTS

| | | | |
|---|---|---|---|
| JP | 2015145181 A | * | 8/2015 |
| KR | 20180070123 A | | 6/2018 |

(Continued)

OTHER PUBLICATIONS

JP2015145181 Machine Translation.*

*Primary Examiner* — Forrest M Phillips
(74) *Attorney, Agent, or Firm* — Christopher G. Darrow; Darrow Mustafa PC

(57) ABSTRACT

A sound-absorbing device includes a resonator. The resonator includes a flexible, tube-shaped resonator body having a first end, a second end, and a channel fluidically connecting the first end and the second end. The resonator body is wrapped completely around a hub of a vehicle wheel at least one time and is configured to absorb sound produced within a cavity of a tire of the vehicle wheel.

15 Claims, 6 Drawing Sheets

(56) References Cited

U.S. PATENT DOCUMENTS

| | | | |
|---|---|---|---|
| 2020/0023684 A1* | 1/2020 | Osawa | B60C 23/0494 |
| 2021/0138832 A1* | 5/2021 | Xu | B60C 19/002 |
| 2022/0080784 A1 | 3/2022 | Yoon et al. | |

FOREIGN PATENT DOCUMENTS

| | | | | |
|---|---|---|---|---|
| KR | 20180125823 A | 11/2018 | | |
| KR | 20190081494 A | 7/2019 | | |
| KR | 20210005343 A | 1/2021 | | |
| KR | 102262129 B1 | 6/2021 | | |
| KR | 102302964 B1 | 9/2021 | | |
| WO | WO-2020157907 A1 * | 8/2020 | | B60C 19/002 |

* cited by examiner

SOUND-ABSORBING DEVICE FOR A VEHICLE WHEEL

TECHNICAL FIELD

The present disclosure relates generally to sound absorbing devices and, more particularly, to sound absorbing devices for vehicle wheels.

BACKGROUND

Vehicle wheels typically include a hub and a tire mounted to the hub. The tire is usually hollow and includes a cavity, and in some instances, sound is produced in the cavity as the tire rolls on the ground during driving of the vehicle. This sound can be undesirable to a driver of the vehicle. The present disclosure addresses issues related to mitigating sound produced by vehicle wheels.

SUMMARY

This section provides a general summary of the disclosure and is not a comprehensive disclosure of its full scope or all of its features.

In one form of the present disclosure, a sound-mitigating device includes a resonator. The resonator is configured to mitigate sound within a cavity of a tire of a vehicle wheel. The resonator includes a flexible, tube-shaped resonator body having a first end, a second end, and a channel fluidically connecting the first end and the second end. The resonator body is configured to wrap completely around a hub of a vehicle wheel at least one time and absorb sound produced within the cavity.

In another form of the present disclosure, a vehicle wheel includes a hub and a tire mounted to the hub and defining a hollow cavity. The vehicle wheel also includes a resonator. The resonator is configured to mitigate sound within the cavity. The resonator includes a flexible, tube-shaped resonator body having a first end, a second end, and a channel fluidically connecting the first end and the second end. The resonator body is configured to wrap completely around the hub at least one time. The resonator is configured as a quarter-wavelength resonator having a resonance frequency that is a function of a length of the resonator body and that is substantially equal to a resonance frequency of a sound produced by the tire rolling on the ground.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides a sound-absorbing device for a vehicle wheel. The sound-absorbing device includes a resonator. The resonator includes a flexible, tube-shaped resonator body having a first end, a second end, and a channel fluidically connecting the first end and the second end. The resonator body is wrapped completely around a hub of a vehicle wheel at least one time and is configured to absorb sound produced within a cavity of a tire of the vehicle wheel.

Figure 1A:
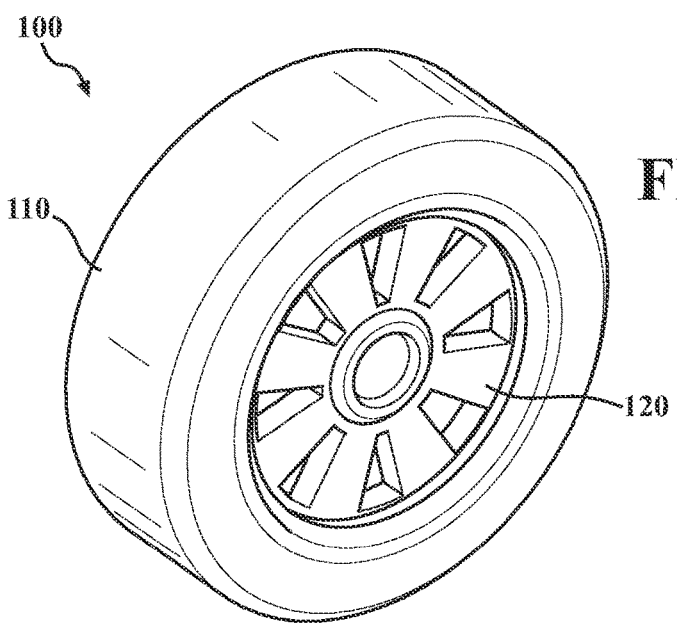
FIG. 1A shows an example of a vehicle wheel including a hub and a tire.
Figure 1B:
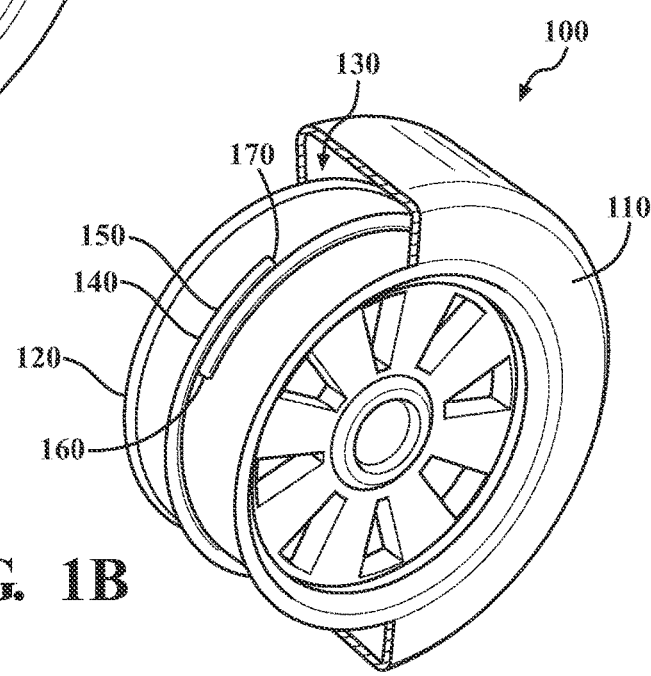
FIG. 1B shows an example of a cross-section of the vehicle wheel including a sound-absorbing device having a resonator.

Referring to FIGS. 1A and 1B, an example of a wheel 100 for a vehicle is shown. Among other components typical of vehicle wheels, the wheel 100 includes a tire 110 and a hub 120. The tire 110 can be a standard tire typical of vehicles and formed from rubber. The tire 110 is hollow, defines a cavity 130, and is configured to be mounted to the hub 120. As the wheel 100 rolls on a ground upon which the vehicle is traveling, sound may be produced within the cavity 130. In some instances, this sound can be undesirable to a driver of the vehicle. Therefore, it may be advantageous to absorb at least some of the sound produced within the cavity 130.

Figure 2:
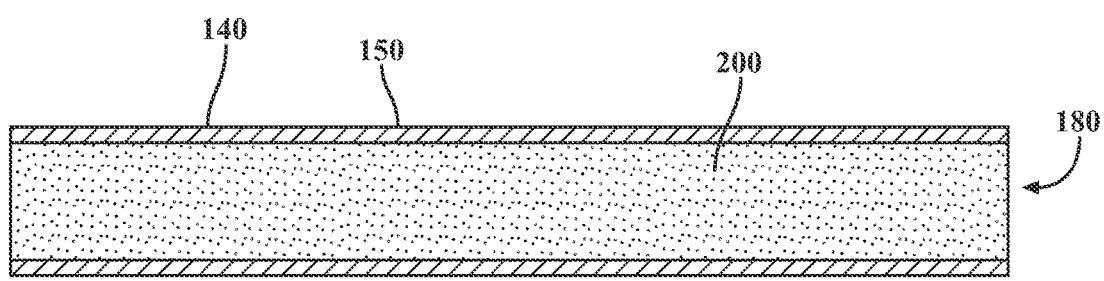
FIG. 2 shows an example of the resonator filled with sound-absorbing material.

Accordingly, the wheel 100 includes a sound-absorbing device. The sound-absorbing device is located within the cavity 130 and is configured to absorb sound produced within the cavity 130 as the wheel 100 rolls on the ground. The sound-absorbing device includes a resonator 140. The resonator 140 includes a resonator body 150, which is long, flexible, and tube-like and can be configured to wrap around the hub 120 one or more times. As used herein, the term "flexible" means that the resonator body 150 is pliable enough to wrap around the hub 120 without incurring significant stresses in the material of the resonator body 150 that might lead to the material ripping or breaking. The resonator body 150 also includes a first end 160 and a second end 170 and defines a channel 180 (FIG. 2) fluidically connecting the first end 160 and the second end 170. As molecules of air or other gas within the cavity 130 pass through the channel 180, the channel 180 significantly restricts movement of the molecules, and friction between the molecules increases. Accordingly, acoustic energy is dissipated in the form of heat due to the friction, and sound is absorbed by the resonator 140.

As described herein, the channel 180 is substantially hollow. However, in one or more arrangements, referring to FIG. 2, the channel 180 may be filled with sound-absorbing material 200. As shown, the sound-absorbing material 200 fills the entire channel 180. However, it will be understood that, in some arrangements, the sound-absorbing material 200 does not fill the entire channel 180. For example, only a section of the channel 180 may be filled with sound-absorbing material 200. In another example, the entire channel 180 may be lined with sound-absorbing material 200, or only a section of the channel 180 may be lined with sound-absorbing material 200.

Figure 3:
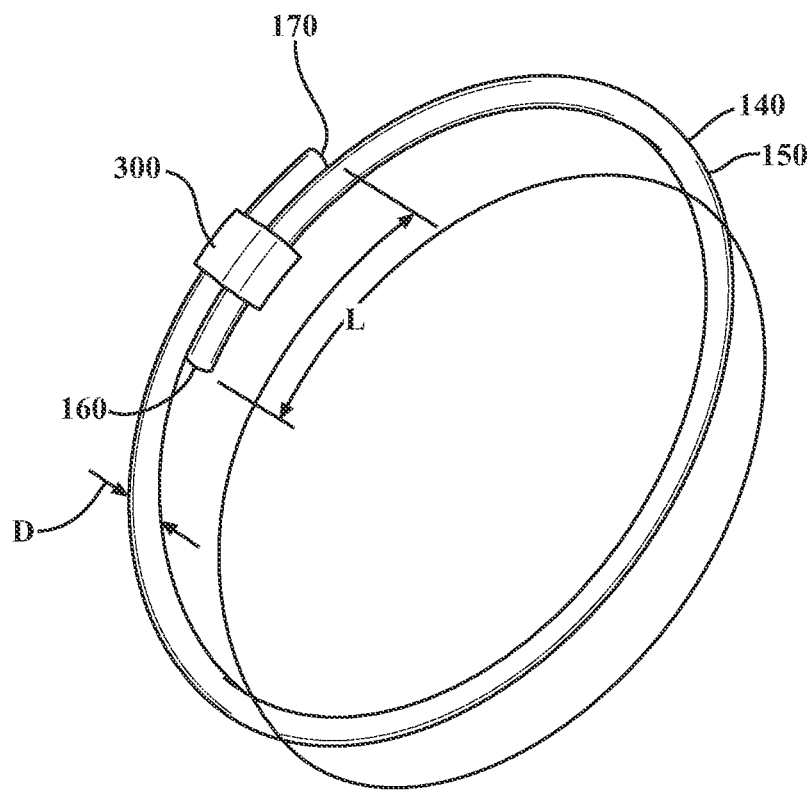
FIG. 3 shows an example of a mount for adhering the resonator to the hub.

Referring back to FIGS. 1A and 1B, in one or more arrangements, the resonator body 150 is formed from flexible tubing. For example, the resonator body 150 can be formed from commercially-available silicone or rubber tubing. However, any other suitable material may be used to form the resonator body 150. In some instances, the material forming the resonator body 150 is lightweight. The resonator body 150 can be formed in any suitable manner. For example, the resonator body 150 can be formed by cutting commercially available tubing to a desired size. In other examples, the resonator body 150 can be formed by extruding, molding, or otherwise forming plastic or silicone-based material into a tube shape. Once formed to the desired size, the resonator body 150 defines an inner diameter D and a length L (FIG. 3). The inner diameter D and/or the length L can be any suitable dimension. In some instances, the inner diameter D has the same dimension along the length L of the resonator body 150. In other instances, the inner diameter D may vary along the length L of the resonator body 150. The length L, in some instances, is substantially equal to or greater than a circumference of the hub 120.

The resonator body 150 can be attached to the hub 120 in any suitable manner. In one or more arrangements, the resonator body 150 is adhered directly to the hub 120. For example, the resonator body 150 can be glued or taped directly to the hub 120. In one or more other arrangements, referring now to FIG. 3, the resonator body 150 can be attached to the hub 120 using a mount 300. The mount 300 can be unitarily formed with the hub 120, or the mount 300 can be configured for attachment to the hub 120. The mount 300 can include one or more apertures configured to hold the resonator body 150 at a location near both the first end 160 and the second end 170, as shown. In one or more arrangements, the aperture(s) can have a diameter slightly larger than an outer diameter of the resonator body 150, and the resonator body 150 can be adhered to the mount 300, for example, by glue. In one or more other arrangements, the aperture(s) can have a diameter substantially equal or less than the outer diameter of the resonator body 150 such that the resonator body 150 forms a tight fit (e.g., a press fit) with the aperture(s) to keep the resonator 140 in place.

In one or more arrangements, the resonator 140 is a quarter-wavelength resonator 140. As mentioned above, the resonator body 150 defines an inner diameter D and a length L. In some instances, the inner diameter D of the resonator body 150 governs the bandwidth of the sound absorbed by the resonator 140. Accordingly, the inner diameter D can have any suitable dimension that creates a high friction between the air molecules in the channel 180. Moreover, in some instances, the length L of the resonator body governs the resonance frequency f of the resonator 140. For example, the resonance frequency f is defined by the following equation, where c is the speed of sound and n is the harmonic index (n=1, 3, 5, 7, etc.). The harmonic index will be described in further detail below.

$$f, n = \frac{cn}{4L}$$

Figure 4:
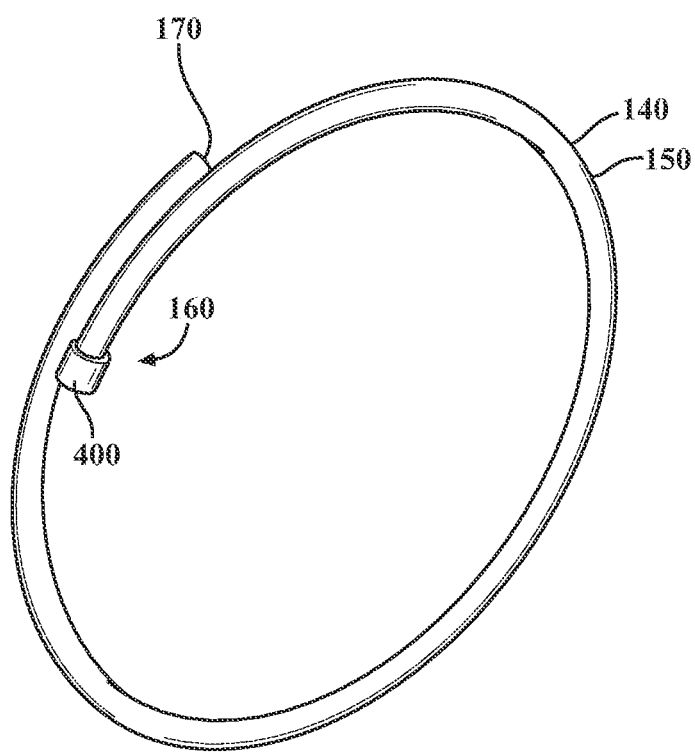
FIG. 4 shows an example of an end cap for the resonator.

In some instances, it may be advantageous to tune the resonance frequency f to a frequency of the sound produced by the tire 110 rolling on the ground as the vehicle is driven, which, in some instances, is about 500-1000 Hz. However, it will be understood that the resonance frequency f may be tuned to any other suitable resonance frequency. In one or more arrangements, the resonance frequency f can be changed by the addition of one or more components to the resonator 140. For example, referring now to FIG. 4, the resonator 140 may include a cap 400. The cap 400 can be configured to change the resonance frequency f, for example, by changing the speed of the sound traveling through the channel 180. More specifically, a resonator 140 with two open ends may function as a different type of resonator rather than a quarter-wavelength resonator. The cap 400 can be attached to the first end 160 or the second end 170, and the cap 400 can be attached to the resonator 140 in any suitable manner. For example, the cap 400 can define an aperture configured to receive the first end 160 or the second end 170. In one or more arrangements, the aperture can have a diameter slightly smaller than an outer diameter of the resonator body 150, and the resonator body 150 can be adhered to the cap 400, for example, by glue. In one or more other arrangements, the aperture can have a diameter substantially equal to or less than the outer diameter of the resonator body 150 such that the resonator body 150 forms a tight fit (e.g., press fit) with the aperture(s) to keep the cap 400 in place.

Though the tire 110 is described above as exhibiting a single resonance frequency, in some instances, the tire 110 may exhibit multiple resonance frequencies. Accordingly, it may be advantageous to design the resonator 140 such that it is configured to absorb sound waves of different frequencies. In one or more arrangements, referring now to FIG. 5A, this may be accomplished by sectioning the channel 180 (FIG. 2) to create two or more resonator body sections 500. Each resonator body section 500 defines its own aperture 510, which allows the passage of air or other gas through the channel 180 of each resonator body section 500, thereby allowing each resonator body section 500 to function as an individual resonator.

Figure 5A:
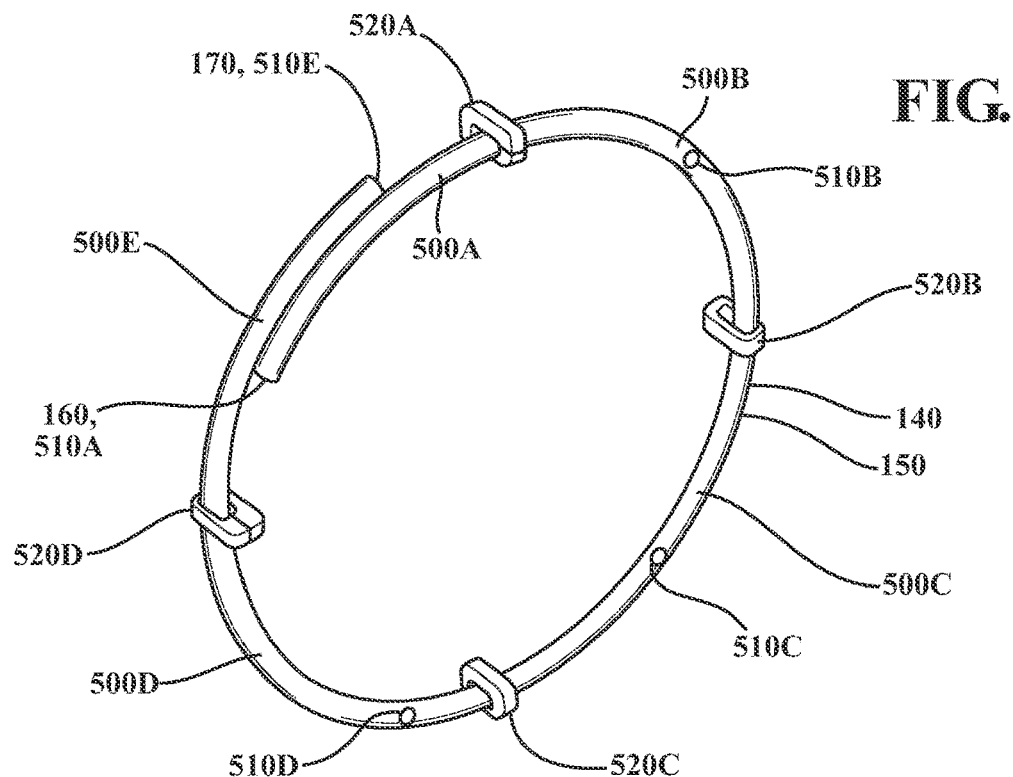
FIG. 5A shows an example of the resonator sectioned into resonator body sections using clamps.

As shown in FIG. 5A, the channel 180 is sectioned to form five (5) resonator body sections 500. The five resonator body sections include a first resonator body section 500A, a second resonator body section 500B, a third resonator body section 500C, a fourth resonator body section 500D, and a fifth resonator body section 500E. However, it will be understood that the channel 180 can be sectioned to form any suitable number of resonator body sections 500, for example, two (2) resonators body sections 500, three (3) resonator body sections 500, four (4) resonator body sections 500, six (6) resonator body sections 500, etc. As mentioned above, each resonator body section 500 defines its own aperture 510. More specifically, the first resonator body section 500A defines a first aperture 510A, the second resonator body section 500B defines a second aperture 510B, the third resonator body section 500C defines a third aperture 510C, the fourth resonator body section 500D defines a fourth aperture 510D, and the fifth resonator body section 500E defines a fifth aperture 510E. In some instances, the first aperture 510A can be the first end 160, and the fifth aperture 510E can be the second end 170.

Figure 5B:
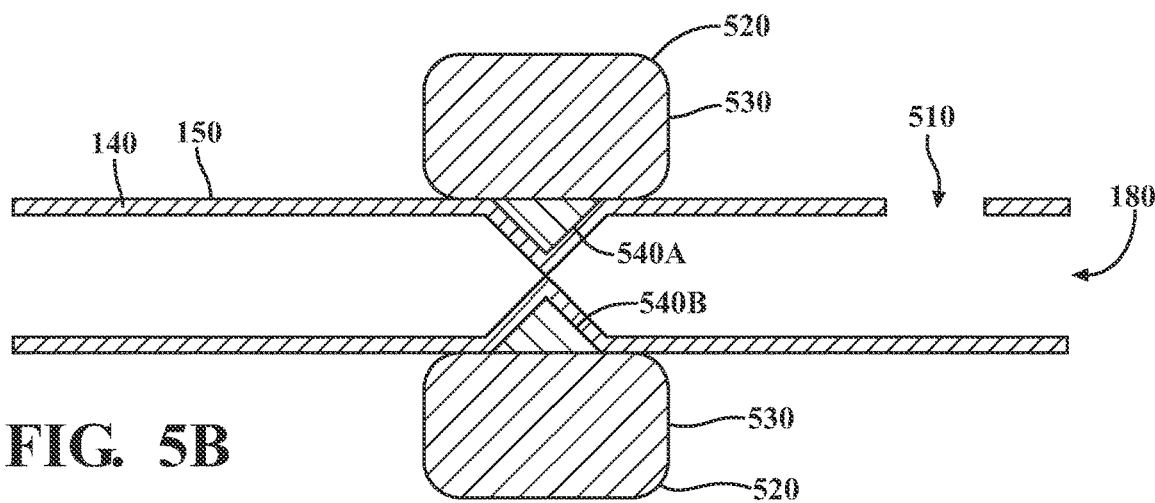
FIG. 5B shows a cross-sectional view of a portion of the resonator body including a clamp.

The channel 180 can be sectioned in any suitable manner. Referring now to FIGS. 5A and 5B, in one or more arrangements, the resonator 140 can include one or more clamps 520. The clamp(s) 520 are configured to clamp the resonator body 150 to block the passage of air or other gas at the point of the clamp 520. As shown in FIG. 5A, the resonator 140 includes four (4) clamps 520 configured to section the resonator body 150 into the five resonator body sections 500. More specifically, the resonator 140 includes a first clamp 520A, a second clamp 520B, a third clamp 520C, and a fourth clamp 520D. However, it will be understood that the resonator 140 can include any suitable number of clamp(s) 520 configured to section the resonator body 150 into any suitable number of resonator body sections 500. The clamp(s) 520 can be positioned along the length L of the resonator body 150 in any suitable manner. For example, as shown in FIG. 5A, the clamp(s) 520 are substantially equally spaced along the length L. However, it will be understood that the clamp(s) 520 can be un-equally spaced along the length L.

The clamp(s) 520 can have any suitable structure. Referring now to FIG. 5B, a cross-sectional view of one arrangement of one of the clamp(s) 520 is shown. The clamp 520 has a clamp body 530 that is configured to close around the resonator body 150. The clamp body 530 defines a first protrusion 540A and a second protrusion 540B respectively positioned across from each other with respect to the resonator body 150. When the clamp body 530 is clamped to the resonator body 150, the first protrusion 540A and the second protrusion 540B pinch the resonator body 150 such that the passage of air or other gas through the channel 180 at the point of the clamp 520 is substantially blocked.

Figure 5C:
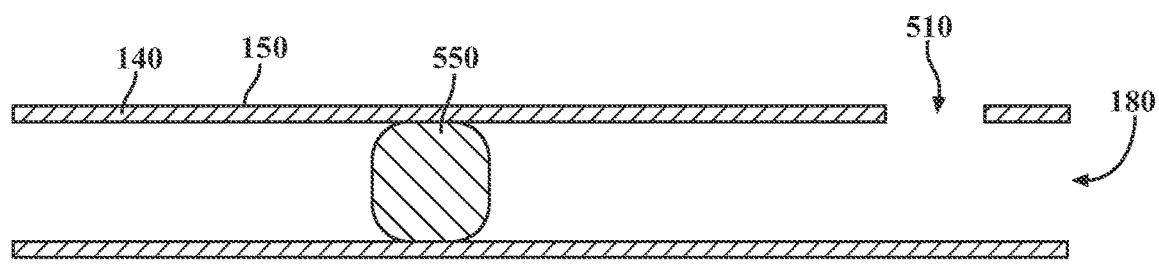
FIG. 5C shows a cross-sectional view of a portion of the resonator sectioned into resonator body sections using a bead.

In one or more other arrangements, referring now to FIG. 5C, the resonator 140 can include one or more beads 550 located in the channel 180 and configured to section the channel 180 into the resonator body sections 500. The bead(s) 550 can be formed from acoustically-rigid material. As used herein, the term "acoustically-rigid" means that the material significantly blocks sound from passing through the material. The acoustically-rigid material can be a physically rigid material such as plastic or metal, or the acoustically-rigid material can be a physically softer but still acoustically-rigid material such as foam or even drops of water. Like the clamp(s) 520, the bead(s) 550 can be substantially equally spaced along the length L of the resonator body 150. However, it will be understood that the bead(s) 550 can be un-equally spaced along the length L.

Figure 6A:
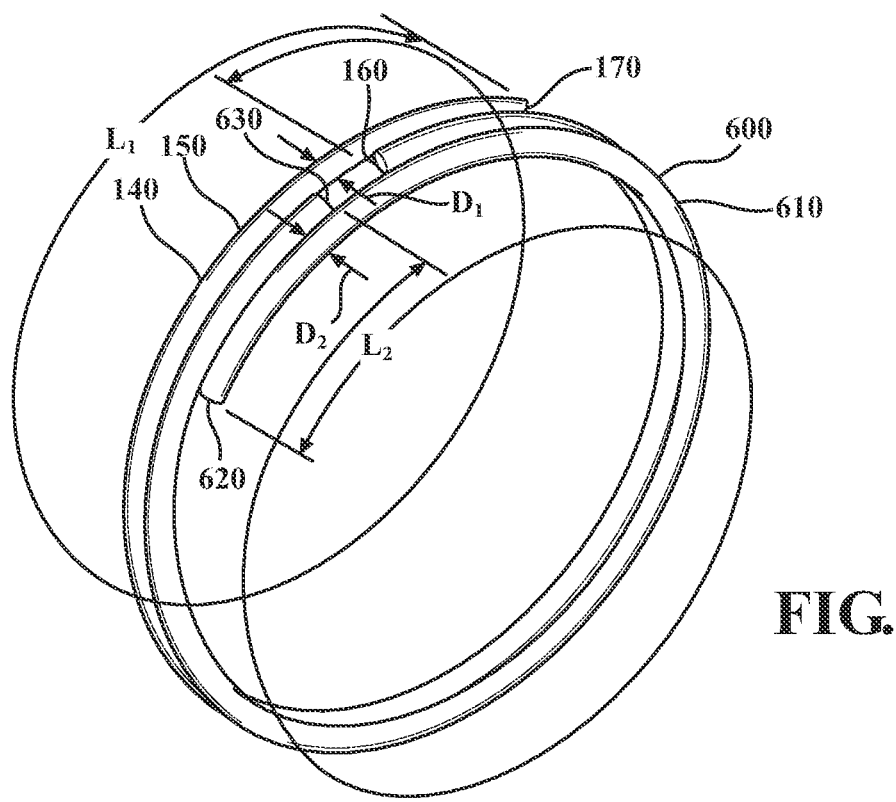
FIG. 6A shows an example of multiple resonators for the vehicle wheel.

Another way to account for multiple resonance frequencies produced by the tire 110 is to use multiple resonators. Referring now to FIG. 6A, the sound-absorbing device can include two resonators. The sound-absorbing device can include a first resonator 140, as described above. The sound-absorbing device can also include a second resonator 600. Like the first resonator 140, the second resonator 600 includes a second resonator body 610, a second resonator first end 620, a second resonator second end 630, and a second resonator channel (not shown) fluidically connecting the second resonator first end 620 and the second resonator second end 630. Both the first resonator 140 and the second resonator 600 can be configured to wrap around the hub 120 one or more times. In some instances, the first resonator 140 and the second resonator 600 can define different inner diameters and/or different lengths such that the first resonator 140 and the second resonator 600 exhibit different resonance frequencies. For example, the first resonator 140 can define a first inner diameter $D_1$ and a first length $L_1$, and the second resonator 600 can define a second inner diameter $D_2$ and a second length $L_2$. In some instances, the first inner diameter $D_1$ and the second inner diameter $D_2$ are different. Similarly, in some instances, the first length $L_1$ and the second length $L_2$ are different. However, it will be understood that the first inner diameter $D_1$ and the second inner diameter $D_2$ can be substantially equal, and the first length $L_1$ and the second length $L_2$ can be substantially equal. Moreover, it will be understood that while FIG. 6A depicts the sound-absorbing device as having two resonators, the sound-absorbing device can include any suitable number of resonators. For example, the sound-absorbing device can include 3 resonators, 4 resonators, 5 resonators, etc.

Figure 6B:
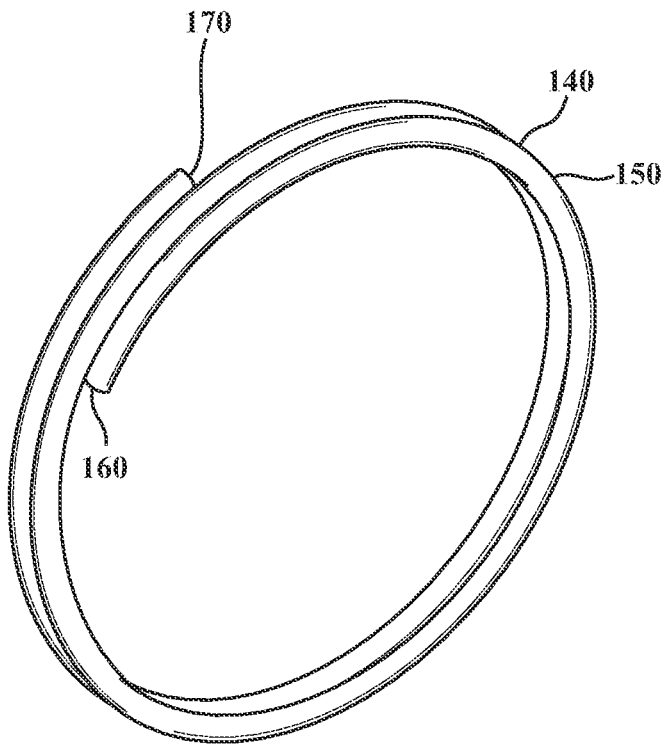
FIG. 6B shows an example of the resonator wrapped multiple times around the hub.

Yet another way to account for multiple resonance frequencies produced by the tire 110 is to design the resonator 140 with a longer length L and wrap the resonator 140 around the hub 120 multiple times. As used herein, the term "longer length" can mean that the resonator 140 has a length L that is long enough to wrap around the hub 120 two or more times (in other words, the length L is greater than two times the circumference of the hub 120). Referring to FIG. 6B, an example of a resonator 140 having a longer length L and being wrapped multiple times around the hub 120 is shown. In arrangements where the resonator 140 is a quarter-wave length resonator 140, a characteristic of the quarter-wavelength resonator 140 is its ability to have multiple resonance modes for a longer length L. Because the frequency interval is inversely proportional to the length L, the longer the resonator 140 is, the smaller the frequency intervals become such that many resonance peaks appear in a given frequency range, and the more resonance frequencies are observed by the resonator 140. For example, the fundamental resonance mode (e.g., the fundamental frequency) is $f_0$. Higher-mode resonances occur in increasing intervals of $2 \ast f_0$. For example, higher-mode resonances occur at $3 \ast f_0$, $5 \ast f_0$, $7 \ast f_0$, etc. Since the higher-mode resonances are multiples of the fundamental resonance, in some instances, it may be advantageous to design the resonator to have the lowest possible fundamental resonance mode. This allows the resonator to have many more higher-mode resonance frequencies for the same length of the resonator body.

Figure 7A:
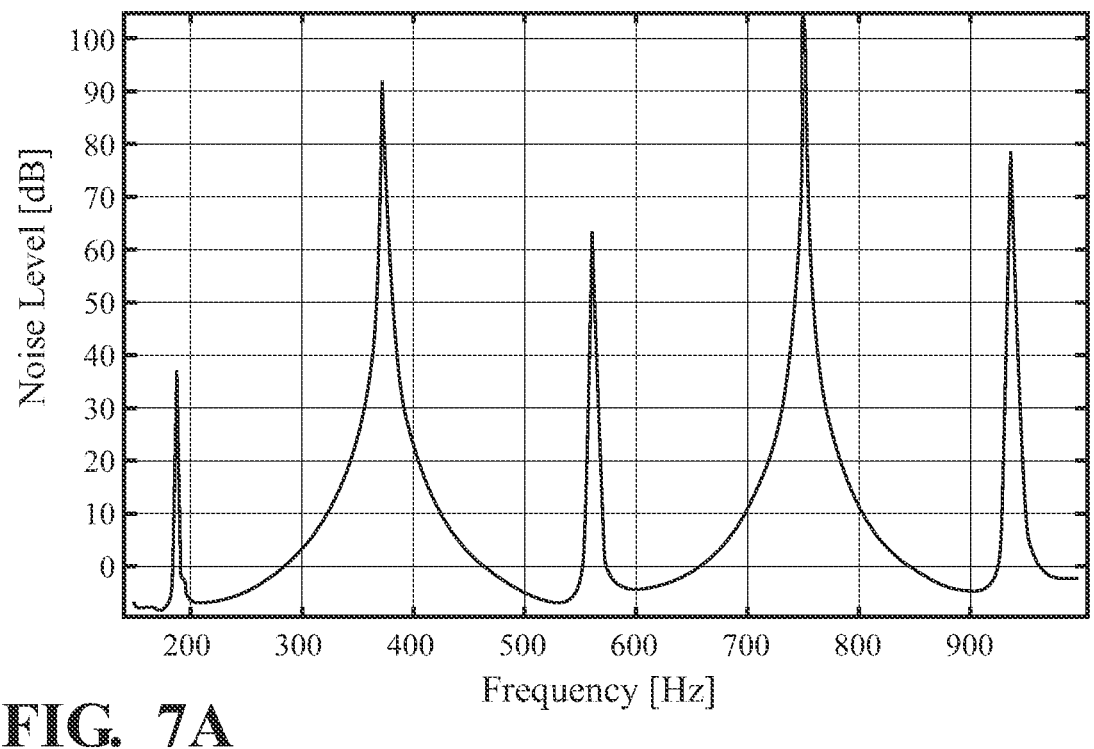
FIG. 7A shows an example of an acoustic spectra of a tire without a resonator.
Figure 7B:
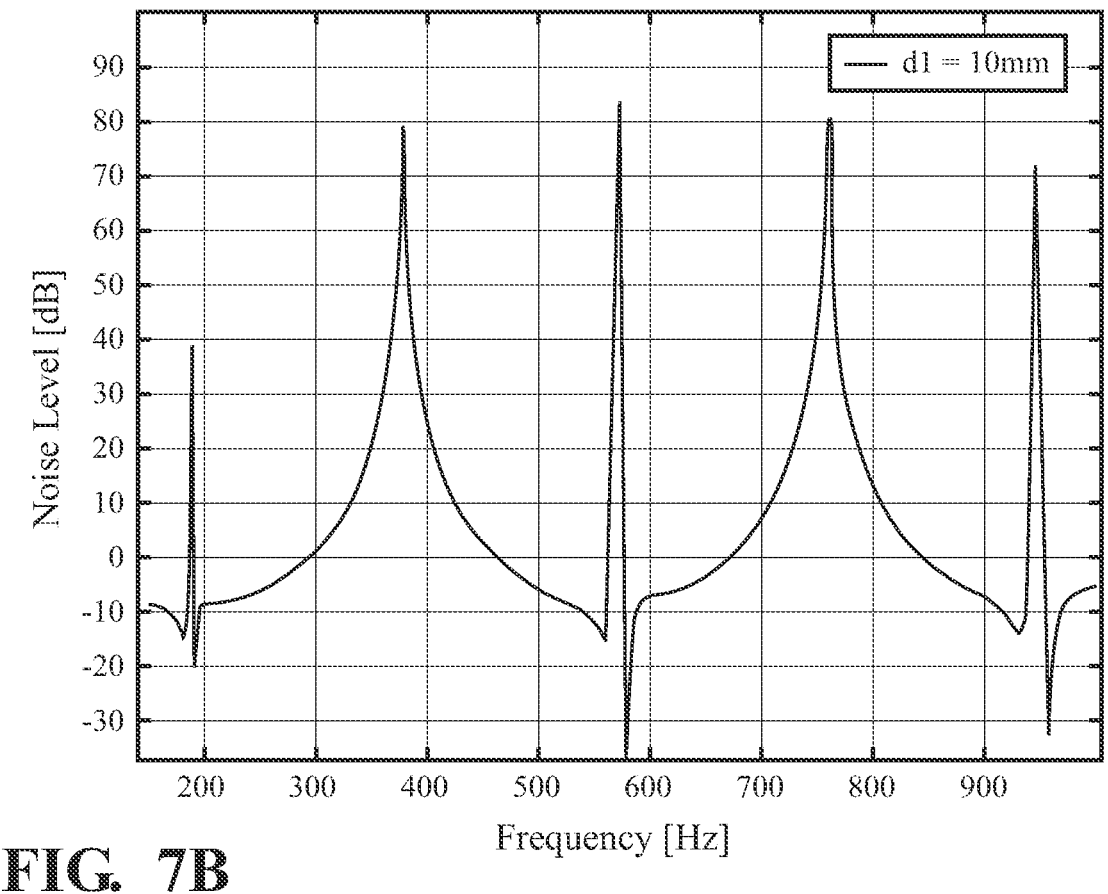
FIG. 7B shows an example of an acoustic spectra of a tire with a resonator having an inner diameter of 10 (millimeters) mm.
Figure 7C:
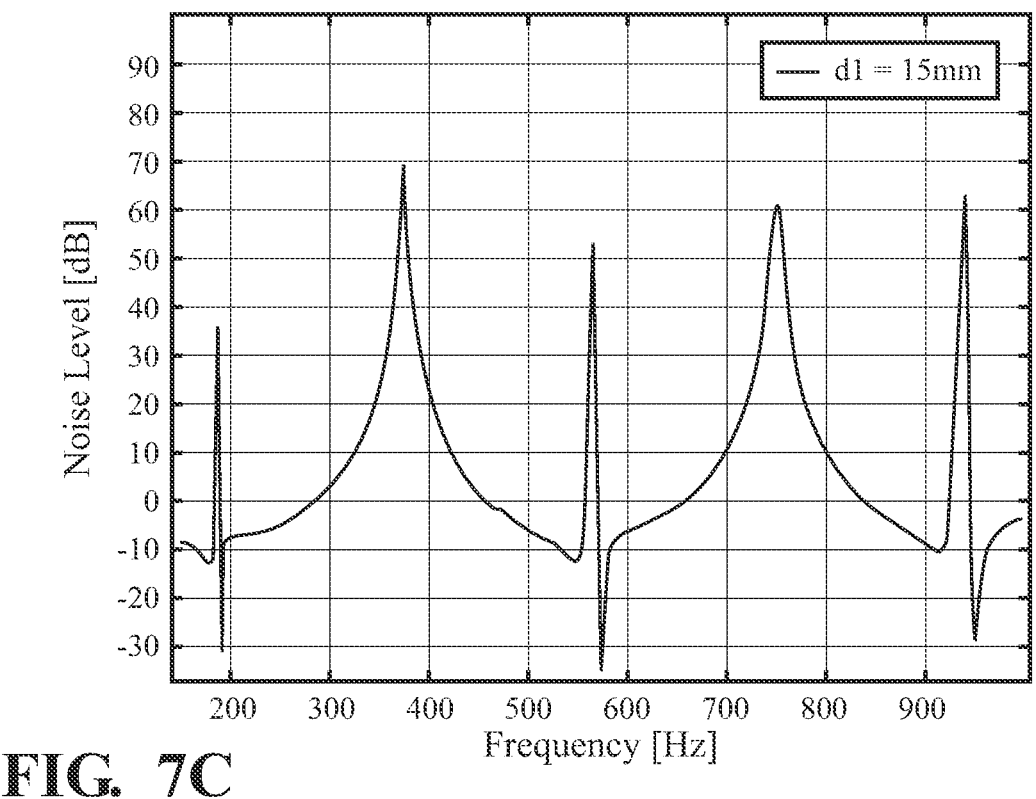
FIG. 7C shows an example of an acoustic spectra of a tire with a resonator having an inner diameter of 15 mm.

Referring now to FIGS. 7A-7C, examples of the acoustic spectra of some of the variations described herein are shown. FIG. 7A shows an acoustic spectrum of the sound produced within a cavity 130 of a tire 110 without a resonator 140. It can be seen that the sound exhibits multiple resonance frequencies. More specifically, the resonance frequencies occur at around 200 Hertz (Hz), around 370 Hz, around 550 Hz, around 750 Hz, and around 950 Hz. The noise level of the first resonance frequency (about 200 Hz) is about 35 decibels (dB). The noise level of the second resonance frequency (about 370 Hz) is about 90 dB. The noise level of the third resonance frequency (about 550 Hz) is about 65 Hz. The noise level of the fourth resonance frequency (about 750 Hz) is about 105 Hz. The noise level of the fifth resonance frequency (around 950 Hz) is about 80 dB.

FIG. 7B shows an example of an acoustic spectrum of the sound produced within the cavity 130 of the tire 110 including a resonator 140 with an inner diameter of about 10 mm. It can be seen that the noise levels of some of the resonance frequencies described above in connection with FIG. 7A are lower. For example, the noise level of the second resonance frequency (about 370 Hz) is about 80 dB. The noise level of the fourth resonance frequency (about 750 Hz) is about 80 Hz. The noise level of the fifth resonance frequency (around 950 Hz) is about 70 dB.

FIG. 7C shows an example of an acoustic spectrum of the sound produced within the cavity 130 of the tire 110 including a resonator 140 with an inner diameter of about 15 mm. It can be seen that the noise levels of some of the resonance frequencies described above in connection with FIGS. 7A and 7B are even lower. For example, the noise level of the second resonance frequency (about 370 Hz) is about 70 dB. The noise level of the third resonance frequency (about 550 Hz) is about 55 Hz. The noise level of the fourth resonance frequency (about 750 Hz) is about 60 Hz. The noise level of the fifth resonance frequency (around 950 Hz) is about 60 dB.

Figure 7D:
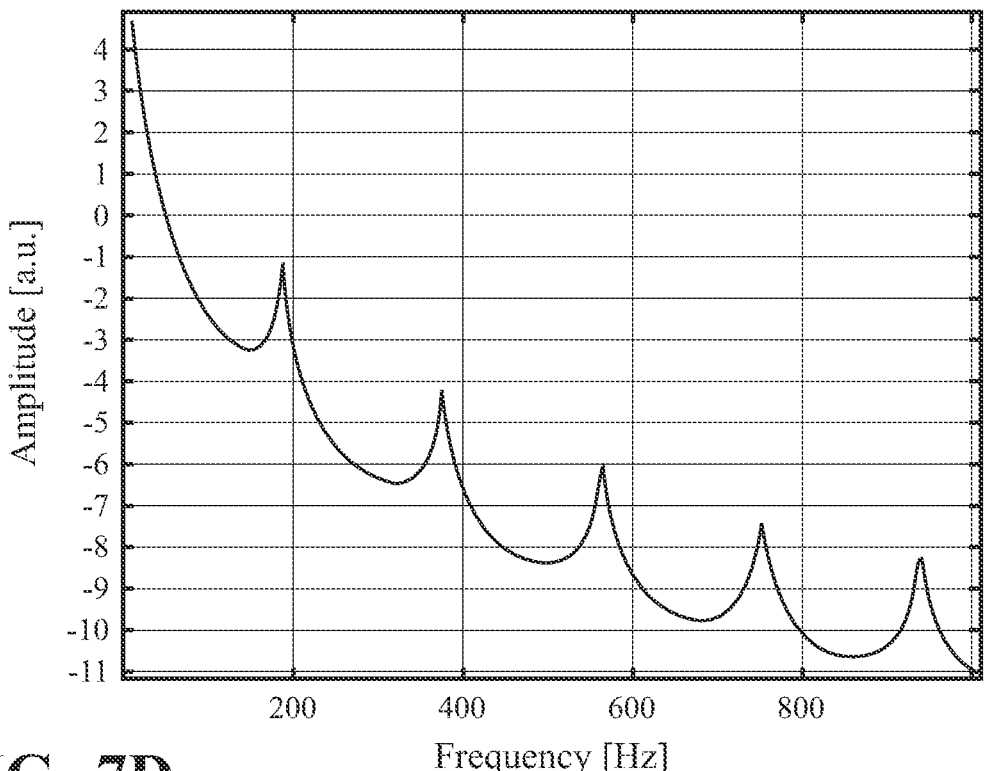
FIG. 7D shows an example of multiple resonance modes of a resonator having a longer length.

FIG. 7D shows an example of an acoustic spectrum of the sound produced within a cavity 130 of a tire 110 with a resonator 140 having a longer length, for example, the resonator of FIG. 6B. It can be seen that the resonator 140 exhibits multiple resonance modes, for example, a first resonance mode at about 1 Hz, a second resonance mode at about 200 Hz, a third resonance mode at about 280 Hz, a fourth resonance mode at about 480 Hz, a fifth resonance mode at about 670 Hz, and a sixth resonance mode at about 870 Hz. These resonance modes may correspond to the resonance frequencies of the sound produced within the cavity 130 as the tire 110 rolls on the ground during driving.

The variations described herein have the benefit of absorbing sound produced within a cavity of a tire of a vehicle wheel as the wheel rolls on the ground during driving. Moreover, the variations described herein allow for sound-absorption within a tire without the need for high-cost manufacturing of sound-absorbing devices within the hub of the wheel itself. Additionally, the variations described herein may allow for low-cost sound absorption, as the resonator can be produced with standard, low-cost materials.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations, means that a particular feature, structure, or characteristic described in connection with a form, a variation, or a particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A sound-absorbing device, comprising:
   a resonator including a flexible, tube-shaped resonator body formed from rubber or silicone tubing having a first end, a second end, and a channel fluidically connecting the first end and the second end, the resonator body wrapped completely around a hub of a vehicle wheel at least one time and configured to absorb sound produced within a cavity of a tire of the vehicle wheel; and
   one or more beads located in the channel and configured to section the channel into a plurality of resonator body sections.

2. The sound-absorbing device of claim 1, wherein the resonator body is adhered directly to the hub.

3. The sound-absorbing device of claim 1, further comprising a mount configured to adhere the resonator body to the hub.

4. The sound-absorbing device of claim 1, wherein the resonator is a quarter-wavelength resonator having a resonance frequency that is a function of a length of the resonator body.

5. The sound-absorbing device of claim 4, wherein the resonance frequency is substantially equal to a resonance frequency of a sound produced by the tire rolling on a ground surface.

6. The sound-absorbing device of claim 4, further comprising a cap covering one of the first end and the second end, thereby changing the resonance frequency.

7. The sound-absorbing device of claim 1, wherein the one or more beads are acoustically rigid foam beads, and wherein each of the plurality of resonator body sections defines an aperture such that each of the plurality of resonator body sections functions as an individual resonator.

8. A sound-absorbing device comprising:
a resonator including a flexible, tube-shaped resonator body formed from rubber or silicone tubing having a first end, a second end, and a channel fluidically connecting the first end and the second end, the resonator body wrapped completely around a hub of a vehicle wheel at least one time and configured to absorb sound produced within a cavity of a tire of the vehicle wheel; and
one or more clamps located external to the resonator body and configured to clamp the resonator body to section the channel into a plurality of resonator body sections, such that the plurality of resonator body sections define unequal lengths.

9. The sound-absorbing device of claim 1, wherein the resonator includes sound-absorbing material located in the channel to further absorb sound within the cavity.

10. The sound-absorbing device of claim 1, wherein the resonator body has a length substantially longer than a circumference of the hub, is wrapped completely around the hub at least two times, and is configured to absorb sound of multiple resonance frequencies, the multiple resonance frequencies including a fundamental frequency and one or more higher-mode resonance frequencies in intervals of twice the fundamental frequency.

11. A vehicle wheel, comprising:
a hub;
a tire mounted to the hub and defining a hollow cavity;
a resonator including a flexible, tube-shaped resonator body formed from rubber or silicone tubing having a first end, a second end, and a channel fluidically connecting the first end and the second end, the resonator body wrapped completely around the hub at least one time, the resonator configured as a quarter-wavelength resonator having a resonance frequency that is a function of a length of the resonator body and that is substantially equal to a resonance frequency of a sound produced by the tire rolling on a ground surface, whereby the resonator is configured to absorb sound produced in the cavity; and
one or more beads located in the channel configured to section the channel into a plurality of resonator body sections.

12. The vehicle wheel of claim 11, further comprising a cap covering one of the first end and the second end, thereby changing the resonance frequency.

13. The vehicle wheel of claim 11, wherein the one or more beads are acoustically rigid foam beads, and wherein each of the plurality of resonator body sections defines an aperture such that each of the plurality of resonator body sections functions as an individual resonator.

14. The vehicle wheel of claim 11, wherein the resonator includes sound-absorbing material located in the channel to further absorb sound within the cavity.

15. The vehicle wheel of claim 11, wherein the resonator body has a length substantially longer than a circumference of the hub, is wrapped completely around the hub at least two times, and is configured to absorb sound of multiple resonance frequencies, the multiple resonance frequencies including a fundamental frequency and one or more higher-mode resonance frequencies in intervals of twice the fundamental frequency.

* * * * *